(12) United States Patent
Iwasaki et al.

(10) Patent No.: US 9,778,460 B2
(45) Date of Patent: Oct. 3, 2017

(54) IMAGING LENS AND IMAGING APPARATUS INCLUDING THE IMAGING LENS

(71) Applicant: FUJIFILM Corporation, Tokyo (JP)

(72) Inventors: Tatsuro Iwasaki, Saitama (JP); Michio Cho, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/256,760

(22) Filed: Sep. 6, 2016

(65) Prior Publication Data

US 2017/0090192 A1 Mar. 30, 2017

(30) Foreign Application Priority Data

Sep. 28, 2015 (JP) ................................. 2015-189770

(51) Int. Cl.
*G02B 13/18* (2006.01)
*G02B 9/64* (2006.01)
(Continued)

(52) U.S. Cl.
CPC ........... *G02B 27/0081* (2013.01); *G02B 9/12* (2013.01); *G02B 13/008* (2013.01); *G02B 13/0035* (2013.01); *G02B 13/06* (2013.01); *G02B 27/0025* (2013.01); *G06K 9/00885* (2013.01); *G02B 5/005* (2013.01); *G02B 9/00* (2013.01); *G02B 9/02* (2013.01); *G02B 13/001* (2013.01); *G02B 13/002* (2013.01);
(Continued)

(58) Field of Classification Search
CPC ...... G02B 13/04; G02B 13/0035; G02B 9/12; G02B 13/18; G02B 13/0015; G02B 5/005; G02B 15/177; G02B 13/001; G02B 13/002; G02B 9/00; G02B 9/02; G02B 27/0081; G02B 13/008; G02B 13/06; G02B 27/0025; G06K 9/00885; G06K 2009/00932
USPC .................................. 359/716, 740, 753, 784
See application file for complete search history.

(56) References Cited

U.S. PATENT DOCUMENTS

| 5,949,588 A * | 9/1999 | Ohshita | .................... G02B 9/12 |
| | | | 359/716 |
| 7,843,652 B2 * | 11/2010 | Asami | ..................... G02B 9/12 |
| | | | 359/716 |

(Continued)

FOREIGN PATENT DOCUMENTS

| JP | Hei07-072382 A | 3/1995 |
| JP | 2008-134540 A | 6/2008 |

OTHER PUBLICATIONS

Takeda et al., "Measurement of Hemoglobin Concentration using the Noninvasive Peripheral Blood Vessel Monitoring Device with the Near-infrared Spectroscopic Imaging Method", Health Science : Annual Reports of School of Health Sciences, Faculty of Medicine, Kyoto University, vol. 2, pp. 9-13, 2005.

*Primary Examiner* — Evelyn A Lester
(74) *Attorney, Agent, or Firm* — Studebaker & Brackett PC

(57) ABSTRACT

An imaging lens consists of three lenses of, in order from an object side, a first lens having a biconcave shape, and an object-side surface of which is aspherical, a second lens having negative refractive power and a third lens having positive refractive power with a convex surface facing an image side. The absolute value of a curvature radius of an image-side surface of the third lens is less than the absolute value of a curvature radius of an object-side surface of the third lens.

17 Claims, 10 Drawing Sheets

(51) Int. Cl.
  *G02B 27/00* (2006.01)
  *G02B 9/12* (2006.01)
  *G06K 9/00* (2006.01)
  *G02B 13/06* (2006.01)
  *G02B 13/00* (2006.01)
  *G02B 15/177* (2006.01)
  *G02B 9/00* (2006.01)
  *G02B 5/00* (2006.01)
  *G02B 9/02* (2006.01)
  *G02B 13/04* (2006.01)

(52) U.S. Cl.
  CPC .......... *G02B 13/0015* (2013.01); *G02B 13/04* (2013.01); *G02B 13/18* (2013.01); *G02B 15/177* (2013.01); *G06K 2009/00932* (2013.01)

(56) References Cited

U.S. PATENT DOCUMENTS

| | | | |
|---|---|---|---|
| 8,724,239 B2* | 5/2014 | Tsai | G02B 13/0035 359/716 |
| 9,274,322 B1* | 3/2016 | Yin | G02B 13/06 |
| 2014/0016212 A1* | 1/2014 | Kim | G02B 13/04 359/716 |
| 2015/0248050 A1* | 9/2015 | Nakamura | G03B 17/565 359/675 |
| 2016/0054546 A1* | 2/2016 | Yin | G02B 13/06 359/716 |

* cited by examiner

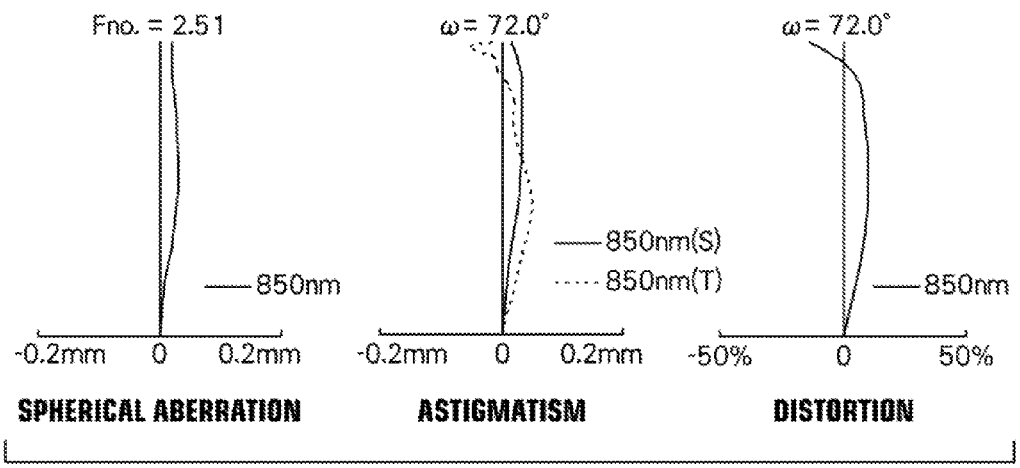
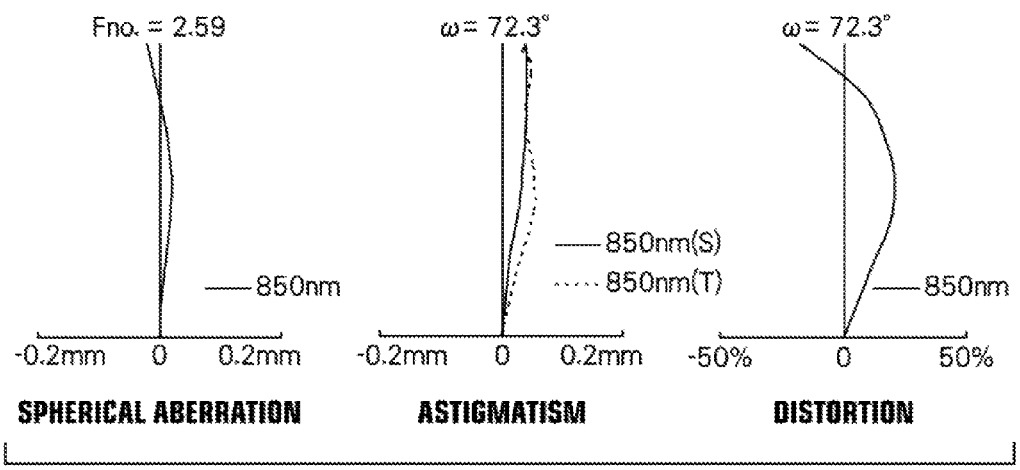

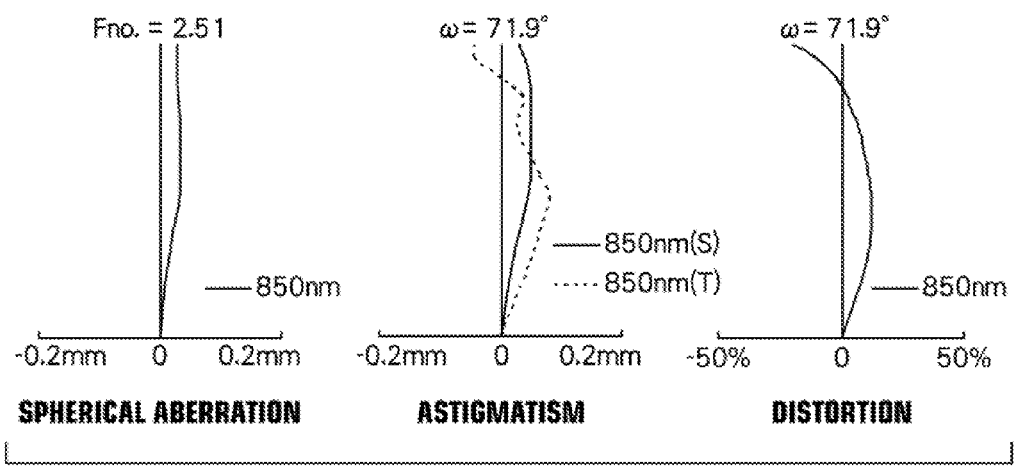
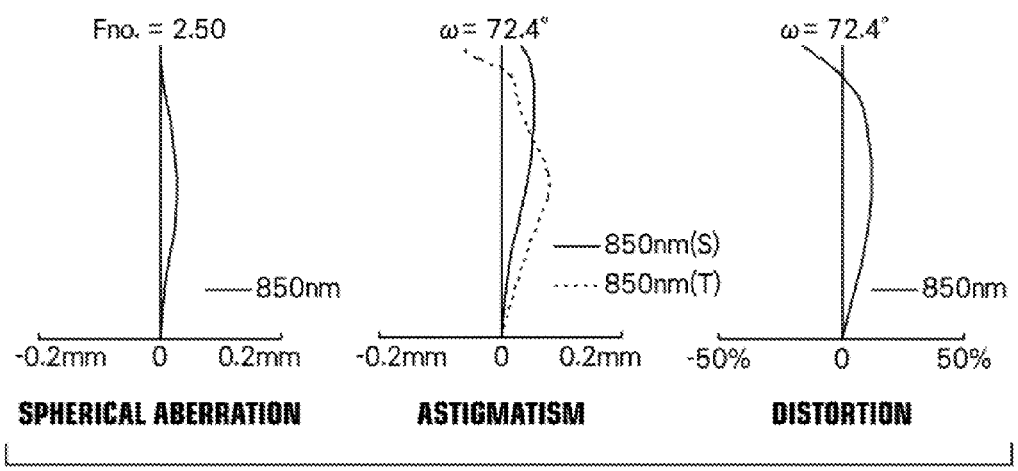

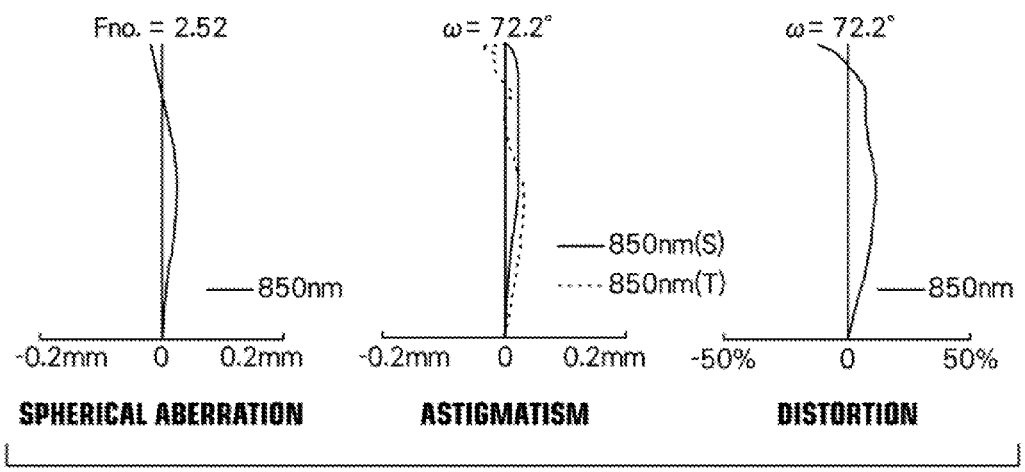
FIG.11   EXAMPLE 5
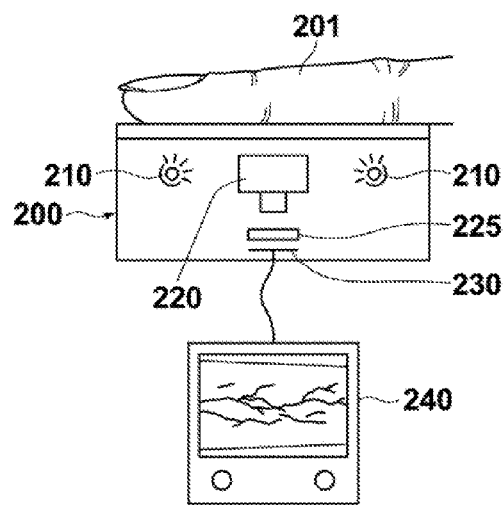
FIG.12

IMAGING LENS AND IMAGING APPARATUS INCLUDING THE IMAGING LENS

CROSS-REFERENCE TO RELATED APPLICATION

The present application claims priority under 35 U.S.C. §119 to Japanese Patent Application No. 2015-189770, filed on Sep. 28, 2015. The above application is hereby expressly incorporated by reference, in its entirety, into the present application.

BACKGROUND

The present disclosure relates to an imaging lens, which forms an image of a subject, and an imaging apparatus mounted with the imaging lens, and which performs imaging.

Conventionally, small-size imaging lenses having wide angles of view, and which can image a wide area even if a distance to an object that is a subject of photography is short, have been applied to various imaging apparatuses. As such imaging apparatuses, known are imaging apparatuses used, for example, in reading apparatuses, such as an image scanner, a copier and a facsimile, which read images and letters, biometric authentication apparatuses, which authenticate a person by detecting the face, the iris of an eye or the positions of veins of a palm, finger or the like of the person, distinguishing apparatuses that distinguish bills and coins, cellular phone terminals, such as a smart phone, portable information terminals, tablet terminals, microscopes, monitoring apparatuses mounted on door phones or cars to monitor outside situations and the like.

For example, Japanese Unexamined Patent Publication No. 2008-134540 (Patent Document 1) and Japanese Unexamined Patent Publication No. H07(1995)-072382 (Patent Document 2) disclose imaging lenses, each consisting of three lenses of, in order from an object side, a lens having negative refractive power, a lens having negative refractive power and a lens having positive refractive power, to achieve a reduced size and a wider angle of view.

SUMMARY

The imaging lenses disclosed in Patent Document 1 and Patent Document 2 are configured to achieve wide angles of view by utilizing distortion. However, it is desirable that distortion is suppressed to accurately authenticate or distinguish an imaged target. Further, it is desirable that the ratio of a maximum image height to the focal length of an entire system as great as possible is ensured to image a wide range at a short object-to-image distance.

To satisfy such needs, it is desirable that the imaging lenses disclosed in Patent Document 1 and Patent Document 2 increase the ratio of the maximum image height to the focal length, because the ratio of the maximum image height to the focal length is too small.

In view of the foregoing circumstances, the present disclosure is directed to provide an imaging lens in which a desirable ratio of the maximum image height to the focal length of the entire system is ensured, and which has excellent image formation performance in the range from a central angle of view to a peripheral angle of view, and an imaging apparatus using this imaging lens.

An imaging lens of the present disclosure consists of three lenses of, in order from an object side, a first lens having a biconcave shape, and an object-side surface of which is aspherical, a second lens having negative refractive power, and a third lens having positive refractive power with a convex surface facing an image side. Further, the absolute value of the curvature radius of an image-side surface of the third lens is less than the absolute value of the curvature radius of an object-side surface of the third lens.

In the imaging lens of the present disclosure, the expression "consists of three lenses" means that the imaging lens of the present disclosure may include lenses substantially without any refractive power, optical elements, such as a stop and a glass cover, other than lenses, mechanical parts, such as a lens flange, a lens barrel, an imaging device and a hand shake blur correction mechanism, and the like besides the three lenses. Further, the sign of the surface shape and the refractive power of the lenses will be considered in a paraxial area in the case that an aspheric surface is included.

In the imaging lens of the present disclosure, it is desirable that an aperture stop located between the second lens and the third lens is further provided.

Further, in the imaging lens of the present disclosure, in the case that an aperture stop located between the second lens and the third lens is further provided, it is desirable that the object-side surface of the first lens includes at least one inflection point at a radially inward position toward an optical axis from an intersection of the object-side surface of the first lens and a principal ray at a maximum angle of view.

Further, in the imaging lens of the present disclosure, it is desirable that the second lens has a meniscus shape with a convex surface facing the object side.

Further, it is desirable that the imaging lens of the present disclosure satisfies one of the following conditional expressions (1) through (6) and conditional expressions (1-1) through (6-1), or an arbitrary combination thereof:

$$-10 < L1f/L1r < -0.1 \tag{1}$$

$$-5 < L1f/L1r < -0.2 \tag{1-1}$$

$$-0.9 < (L1f+L1r)/(L1f-L1r) < 0.9 \tag{2}$$

$$-0.7 < (L1f+L1r)/(L1f-L1r) < 0.7 \tag{2-1}$$

$$-0.2 < f/f1 < -0.05 \tag{3}$$

$$-0.17 < f/f1 < -0.07 \tag{3-1}$$

$$0.5 < f1/f2 < 5 \tag{4}$$

$$0.7 < f1/f2 < 3.5 \tag{4-1}$$

$$0.1 < (L2f-L2r)/(L2f+L2r) < 1 \tag{5}$$

$$0.5 < (L2f-L2r)/(L2f+L2r) < 0.98 \tag{5-1}$$

$$-3 < d23/f12 < -1 \tag{6); and}$$

$$-2.5 < d23/f12 < -1.2 \tag{6-1), where}$$

L1f: a paraxial curvature radius of an object-side surface of the first lens,

L1r: a paraxial curvature radius of an image-side surface of the first lens, f: a focal length of an entire system at the wavelength of 850 nm, f1: a focal length of the first lens at the wavelength of 850 nm, f2: a focal length of the second lens at the wavelength of 850 nm, L2f: a paraxial curvature radius of an object-side surface of the second lens, L2r: a paraxial curvature radius of an image-side surface of the second lens, d23: a distance on an optical axis between the second lens and the third lens, and f12: a combined focal length of the first lens and the second lens at the wavelength of 850 nm.

An imaging apparatus of the present disclosure includes the imaging lens of the present disclosure.

The imaging lens of the present disclosure consists of three lenses of, in order from an object side, a first lens having a biconcave shape, and an object-side surface of which is aspherical, a second lens having negative refractive power, and a third lens having positive refractive power with a convex surface facing an image side. Further, the absolute value of the curvature radius of an image-side surface of the third lens is less than the absolute value of the curvature radius of an object-side surface of the third lens. Therefore, it is possible to provide the imaging lens in which a desirable ratio of the maximum image height to the focal length of the entire system is ensured, and which has excellent image formation performance in the range from a central angle of view to a peripheral angle of view.

The imaging apparatus of the present disclosure includes the imaging lens of the present disclosure, which has excellent image formation performance. Therefore, the imaging apparatus is able to obtain high resolution images by imaging.

BRIEF DESCRIPTION OF THE DRAWINGS

FIG. 7 is aberration diagrams illustrating various aberrations of the imaging lens in Example 1 for infrared rays (the wavelength is 850 nm), and illustrates a spherical aberration, astigmatism and distortion in order from the left side;

FIG. 8 is aberration diagrams illustrating various aberrations of the imaging lens in Example 2 for infrared rays (the wavelength is 850 nm), and illustrates a spherical aberration, astigmatism and distortion in order from the left side;

FIG. 9 is aberration diagrams illustrating various aberrations of the imaging lens in Example 3 for infrared rays (the wavelength is 850 nm), and illustrates a spherical aberration, astigmatism and distortion in order from the left side;

FIG. 10 is aberration diagrams illustrating various aberrations of the imaging lens in Example 4 for infrared rays (the wavelength is 850 nm), and illustrates a spherical aberration, astigmatism and distortion in order from the left side;

FIG. 11 is aberration diagrams illustrating various aberrations of the imaging lens in Example 5 for infrared rays (the wavelength is 850 nm), and illustrates a spherical aberration, astigmatism and distortion in order from the left side;

FIG. 12 is a schematic cross section illustrating the configuration of an imaging apparatus for biometric authentication including the imaging lens of the present disclosure.

DETAILED DESCRIPTION OF THE PREFERRED EMBODIMENTS

Next, an embodiment of the present disclosure will be described in detail with reference to drawings.

Figure 1:
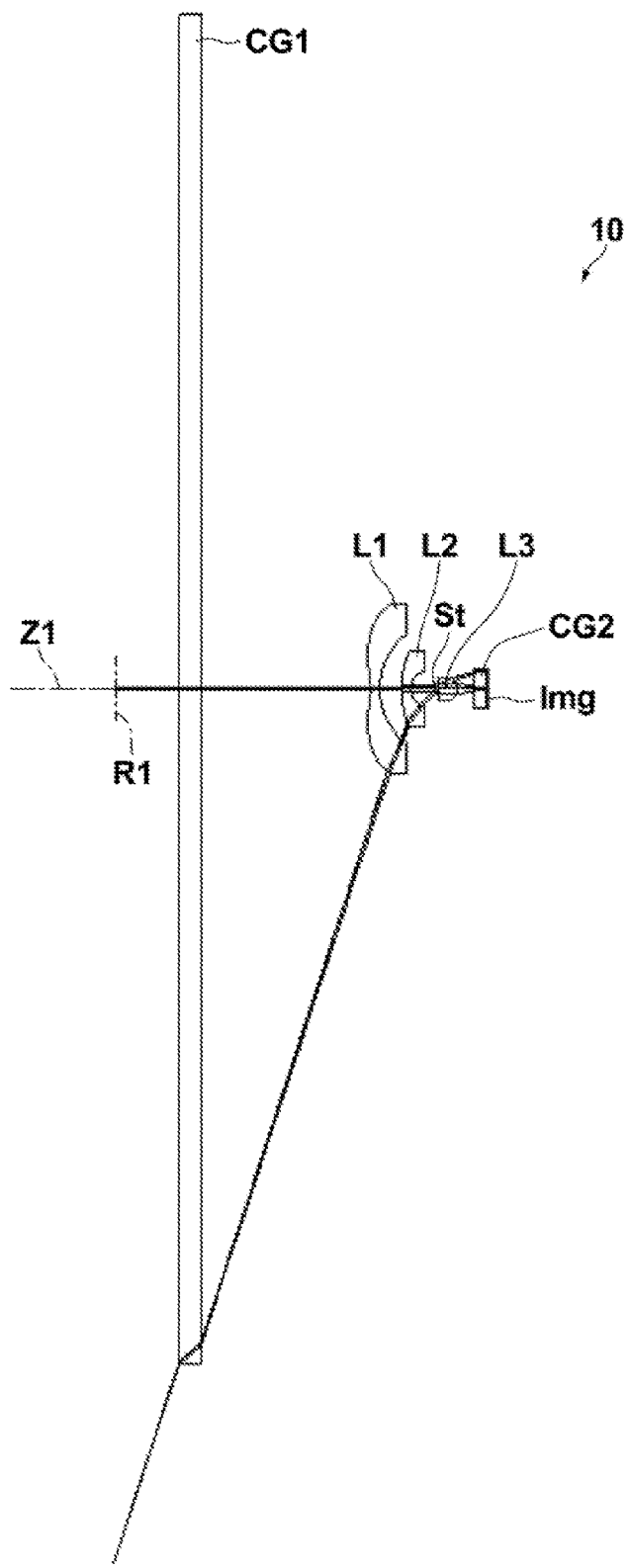
FIG. 1 is a cross section illustrating a first configuration example of an imaging lens according to an embodiment of the present disclosure and paths of rays, and which is a lens cross section corresponding to Example 1.
Figure 2:
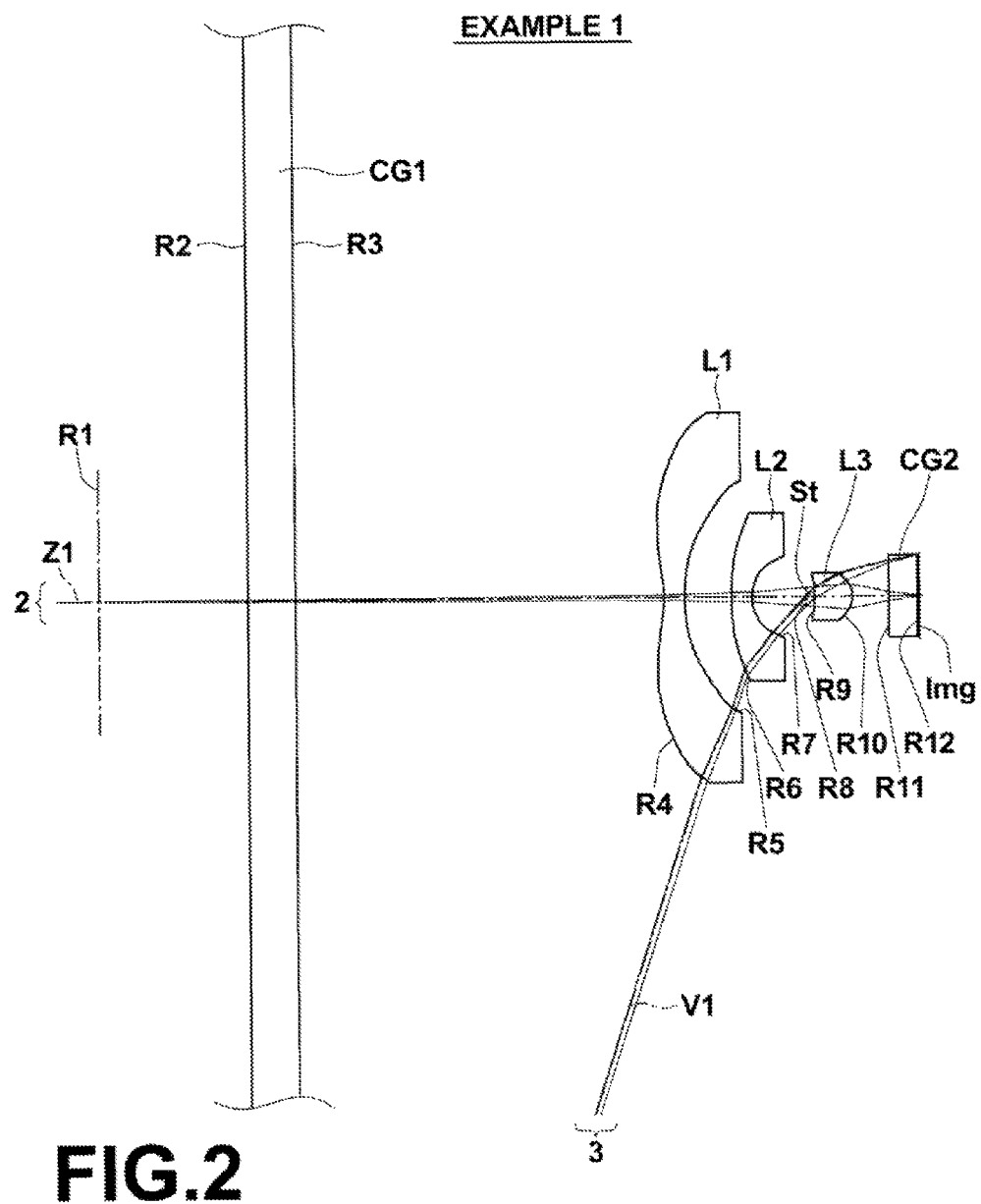
FIG. 2 is an enlarged cross section illustrating a main part of the first configuration example and the paths of rays illustrated in FIG. 1.
Figure 3:
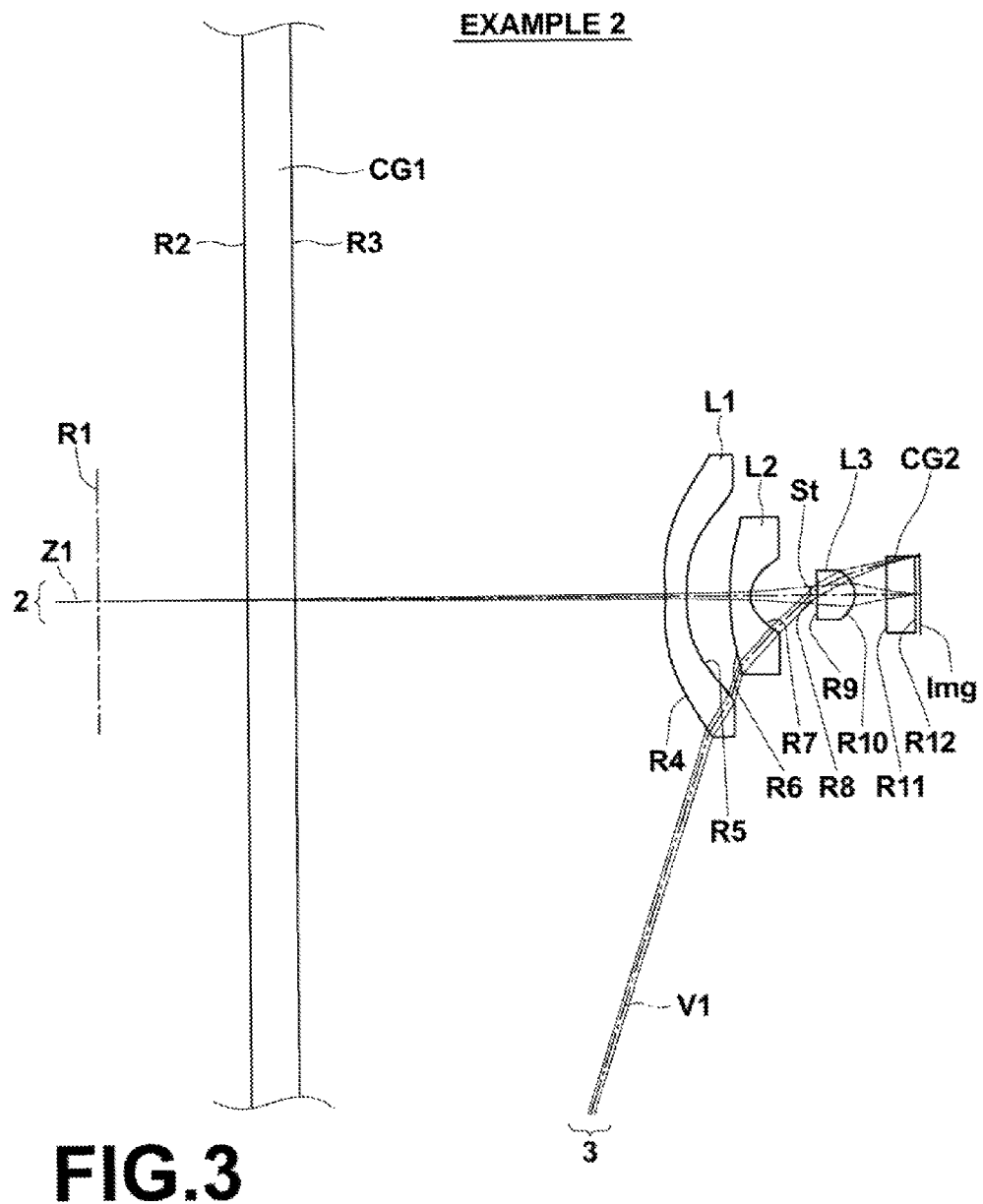
FIG. 3 is an enlarged cross section illustrating a main part of a second configuration example of an imaging lens according to an embodiment of the present disclosure and paths of rays, and which is a lens cross section corresponding to Example 2.
Figure 4:
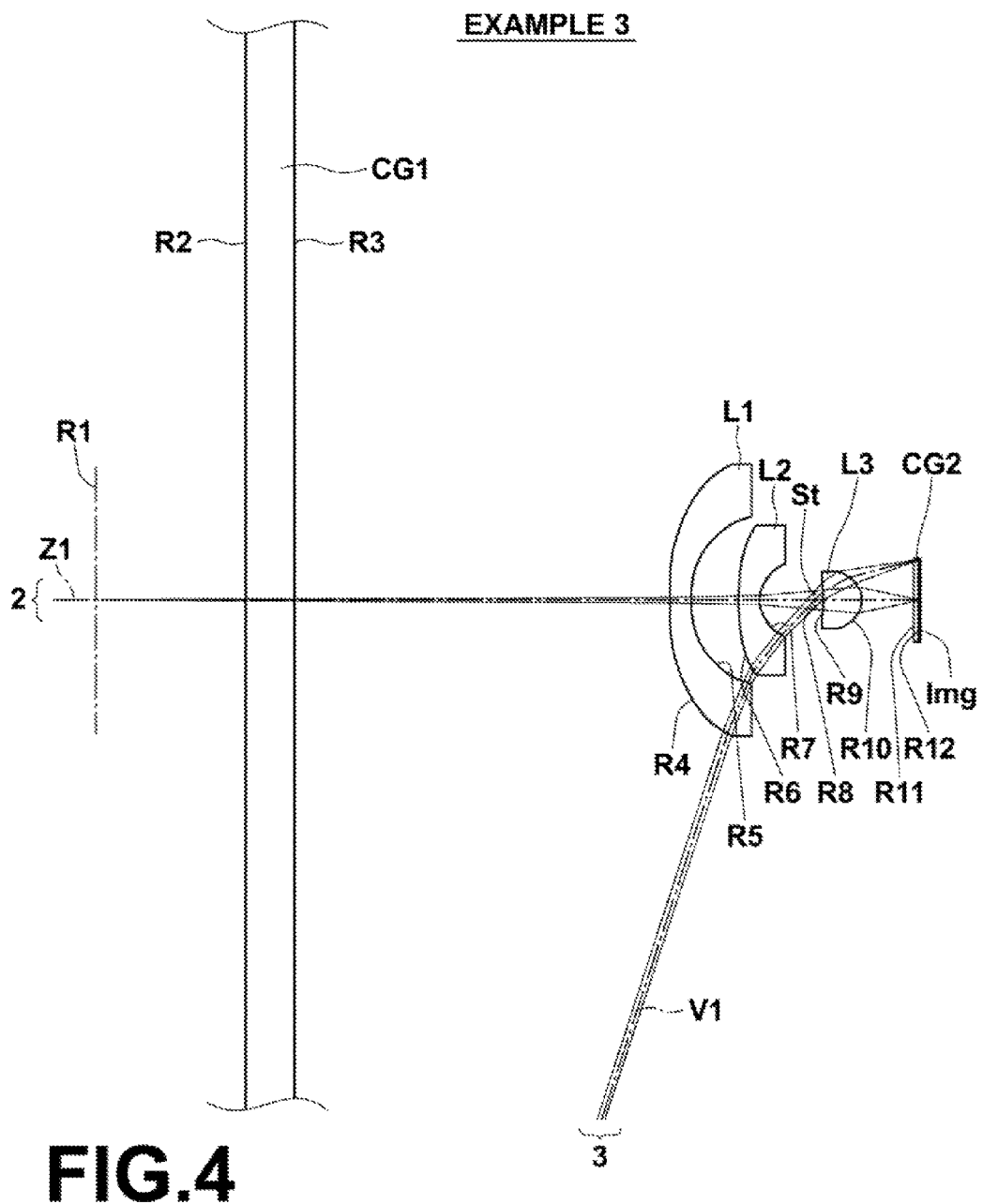
FIG. 4 is an enlarged cross section illustrating a main part of a third configuration example of an imaging lens according to an embodiment of the present disclosure and paths of rays, and which is a lens cross section corresponding to Example 3.
Figure 5:
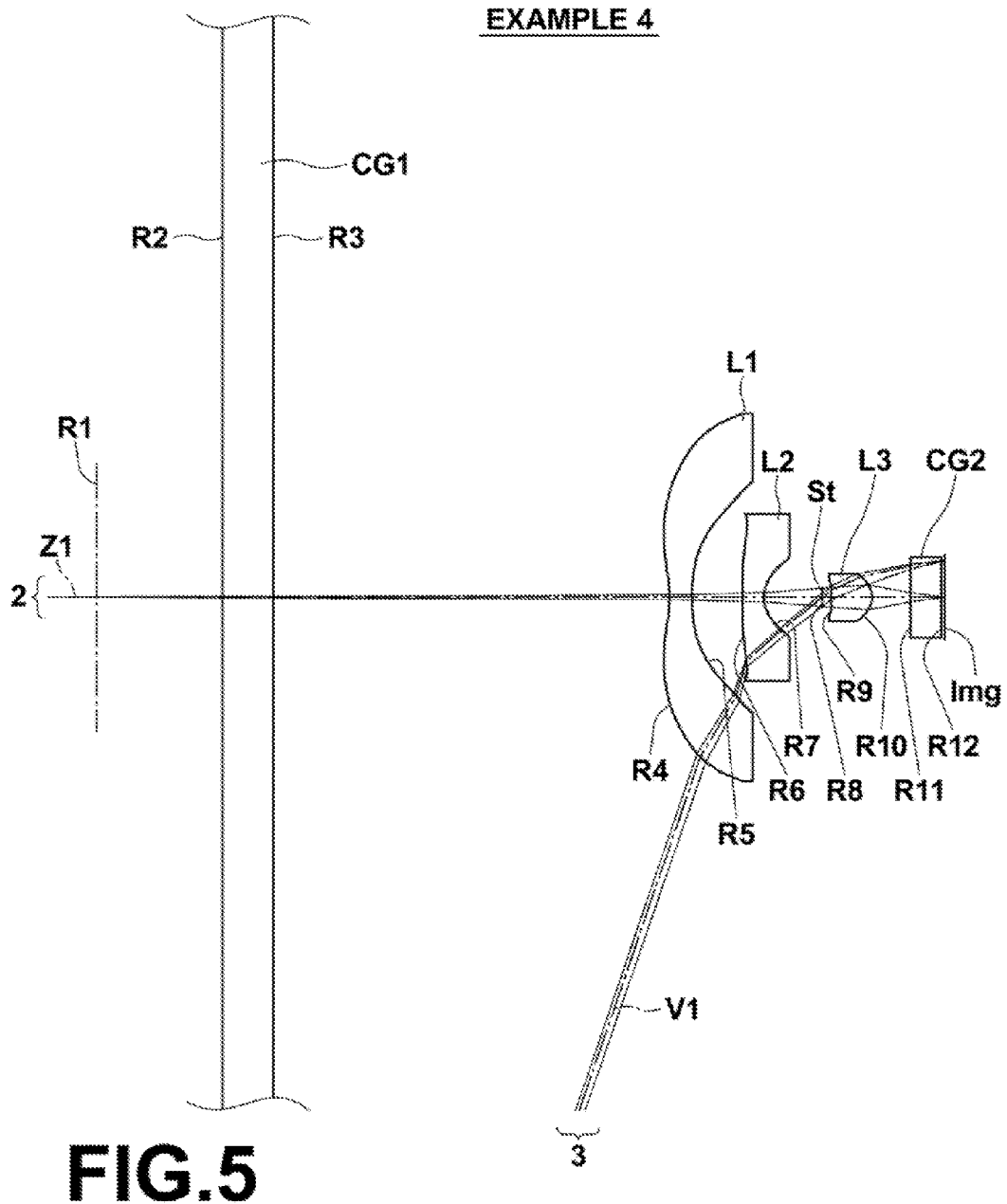
FIG. 5 is an enlarged cross section illustrating a main part of a fourth configuration example of an imaging lens according to an embodiment of the present disclosure and paths of rays, and which is a lens cross section corresponding to Example 4.
Figure 6:
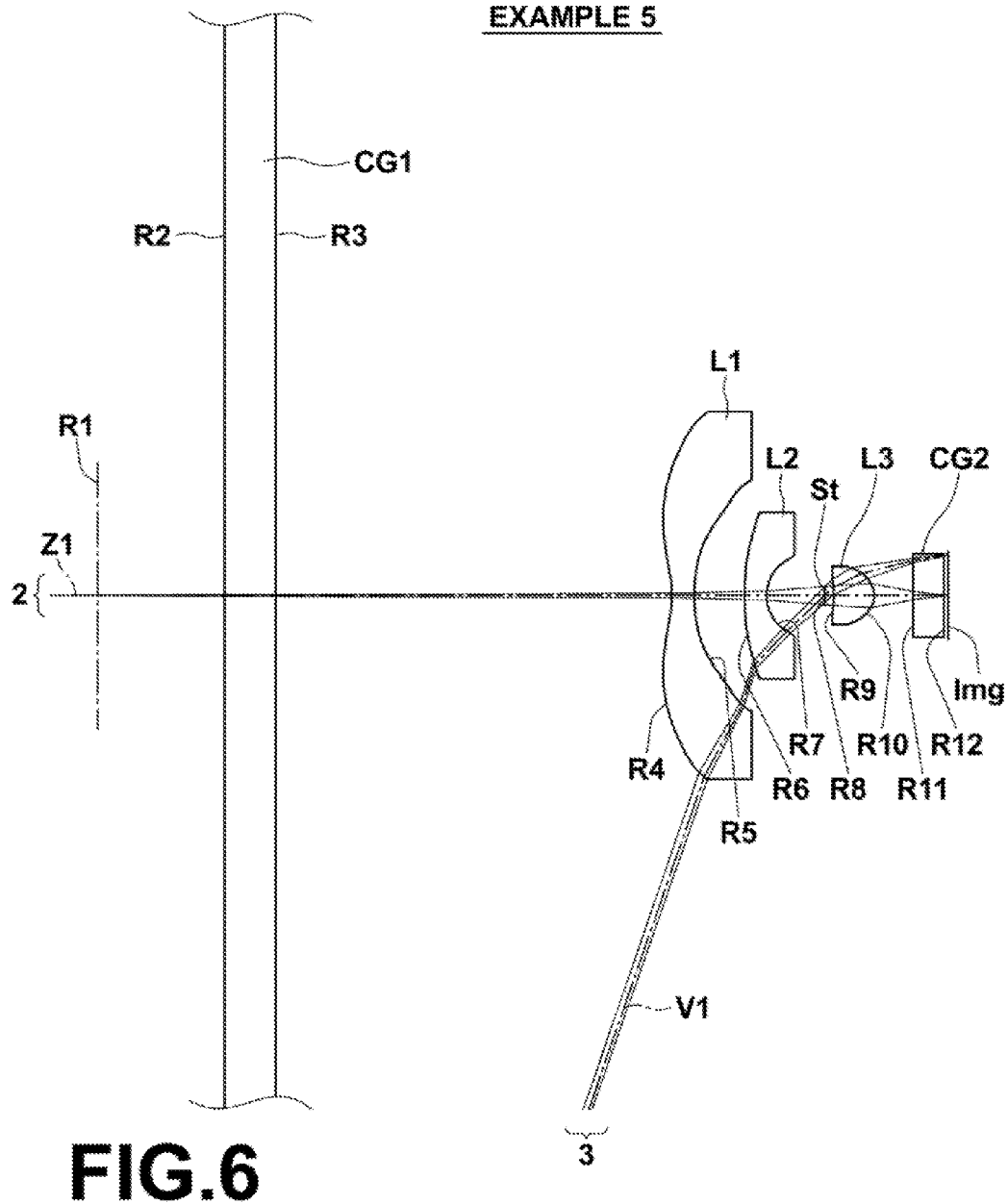
FIG. 6 is an enlarged cross section illustrating a main part of a fifth configuration example of an imaging lens according to an embodiment of the present disclosure and paths of rays, and which is a lens cross section corresponding to Example 5.

FIG. 1 is a cross section illustrating a first configuration example of an imaging lens 10 according to a first embodiment of the present disclosure and paths of rays. FIG. 2 is an enlarged view of a main part of the imaging lens 10 illustrated in FIG. 1.

The configuration example illustrated in FIG. 1 and FIG. 2 corresponds to lens configuration of the first numerical value example (TABLES 1 through 3), which will be described later. In a similar manner to FIG. 2, FIG. 3 through FIG. 6 illustrate cross sections of the configuration of second through fifth configuration examples corresponding to lens configuration of numerical value examples (TABLE 4 through TABLE 15) according to second through fifth embodiments, which will be described later. In FIG. 2, the sign "Ri" represents the curvature radius of an i-th surface to which the sign is assigned in such a manner that the number sequentially increases toward the image side (image formation side) from a surface of optical elements closest to the object side, as the first surface. FIG. 1 and FIG. 2 illustrate an optical path of each of axial rays 2 and rays 3 at a maximum angle of view in the case that a reference wavelength is 850 nm, and an object distance is 1.5 mm. In the rays 3 at the maximum angle of view, principal ray V1 at the maximum angle of view is indicated by a dot dashed line. The meaning of the sign was described by using FIG. 1 and FIG. 2, as examples. The meaning is basically the same for FIG. 3 through FIG. 6.

The basic configuration of the configuration examples is the same. Therefore, the configuration example of the imaging lens illustrated in FIG. 2 will be basically described, and the configuration examples illustrated in FIG. 3 through FIG. 6 will also be described if necessary.

As illustrated in FIG. 1 and FIG. 2, the imaging lens 10 includes, along optical axis Z1 in order from the object side, cover glass CG1 for protecting the lens, first lens L1, second lens L2, aperture stop St, third lens L3 and cover glass CG2 for protecting a light receiving surface. Light receiving surface Img of an imaging device, which is not illustrated, is arranged at an image formation surface, on which an image representing an object as a subject of photography is formed through the imaging lens 10. In FIG. 1 and FIG. 2, R1 is an object plane representing an object position.

First lens L1 has a biconcave shape in the vicinity of an optical axis. Therefore, it is possible to appropriately increase negative refractive power at first lens L1, and that is advantageous to achievement of a wider angle of view.

Further, the object-side surface of first lens L1 is aspherical. Therefore, it is possible to appropriately correct distortion.

Further, it is desirable that the object-side surface of first lens L1 includes at least one inflection point at a radially inward position toward an optical axis from an intersection of the object-side surface of first lens L1 and a principal ray at a maximum angle of view. As a result, it is possible to excellently correct distortion and astigmatism. Here, the term "inflection point" on the object-side surface of first lens L1 means a point at which the shape of the object-side surface of first lens L1 changes from a convex shape to a concave shape (or a concave shape to a convex shape) with respect to the image side. In the present specification, the expression "at a radially inward position toward an optical axis from an intersection of the object-side surface and a principal ray at a maximum angle of view" means the same position as the intersection of the object-side surface and the principal ray at the maximum angle of view or a position that is radially inward toward the optical axis from the intersection. Further, the inflection point provided on the object-side surface of first lens L1 may be arranged at the same position as the intersection of the object-side surface of first lens L1 and the principal ray at the maximum angle of view or an arbitrary position that is radially inward toward the optical axis from the intersection.

Second lens L2 has negative refractive power in the vicinity of the optical axis. Further, it is desirable that second lens L2 has a meniscus shape with a convex surface facing the object side in the vicinity of the optical axis. In the case that second lens L2 has a meniscus shape with a convex surface facing the object side in the vicinity of the optical axis, it is possible to excellently correct distortion.

Third lens L3 has positive refractive power in the vicinity of the optical axis. Further, third lens L3 has a convex surface facing the image side in the vicinity of the optical axis. Further, third lens L3 is configured in such a manner that the absolute value of the curvature radius of the image-side surface is less than the absolute value of the curvature radius of the object-side surface. Therefore, it is possible to suppress an increase in the incidence angle of rays entering an image formation surface (imaging device), and which pass through the optical system, especially in a peripheral part of an image formation area. Further, it is desirable that third lens L3 has a biconvex shape in the vicinity of the optical axis. In this case, it is possible to excellently correct a spherical aberration.

As described above, first lens L1, second lens L2 and third lens L3 are configured to have, in order from the object side, negative refractive power, negative refractive power and positive refractive power in the vicinity of the optical axis. Widening the angle of view while shortening the focal length of the entire system is necessary to reduce an object-to-image distance while maintaining an image magnification ratio (magnification ratio of photography). It is possible to achieve a wider angle of view while appropriately reducing the focal length of the entire system by configuring the refractive power of first lens L1 through third lens L3 as described above.

Further, it is desirable that aperture stop St is located between second lens L2 and third lens L3. In the case that aperture stop St is arranged in this manner, it is possible to suppress an increase in the incidence angle of a principal ray at the maximum angle of view entering an image formation surface (imaging device) especially in a peripheral part of an image formation area.

In the imaging lens 10, it is desirable that a flare stop is provided to prevent flare light and the like caused by stray light entered from the object side and reflection, scatter and the like of light in a lens barrel. A space ring that functions also as a flare stop may be provided, or a similar effect may be given by directly applying coating or coat to a lens or lenses. As a result, it is possible to reduce the number of composition parts, and to reduce the total length of the imaging lens.

Further, cover glass CG1 for protecting a lens, which is a parallel flat plate, may be a protection glass, a filter or a base table on which an object is to be arranged in close contact with the base table. Cover glass CG2 for protecting a light receiving surface, which is a parallel flat plate, is inserted as a cover glass of an imaging device. Cover glass CG2 may be used, for example, as a filter. The thicknesses of the parallel flat plates are not particularly limited. Optimization is possible by the thicknesses. Further, these parallel flat plates are not essential composition elements of the imaging lens 10, and may be omitted.

It is desirable that at least one of surfaces of each of first lens L1 through third lens L3 constituting the imaging lens 10 is aspherical. In this case, the imaging lens 10 is advantageous to achievement of excellent optical performance.

Further, it is desirable that first lens L1 through third lens L3 constituting the imaging lens 10 are single lenses. In this case, the number of lens surfaces is larger than the case in which one of first lens L1 through third lens L3 is a cemented lens. Therefore, the flexibility in design is higher, and that is advantageous to achievement of excellent optical performance.

In the imaging lens 10, which consists of three lenses as a whole, the configuration of each of the lens elements, i.e., first lens L1 through third lens L3, is optimized. Therefore, it is possible to achieve a lens system having high image formation performance in the range from a central angle of view to a peripheral angle of view.

Especially in the imaging lens 10, the configuration of each of the lens elements, i.e., first lens L1 through third lens L3, is optimized. Therefore, distortion is excellently corrected. As a result, it is possible to ensure an appropriate size of maximum image height with respect to the focal length of the entire system of the imaging lens 10. Therefore, the imaging lens 10 is appropriately applicable, as a wide angle imaging lens that performs imaging of a wide range at a short object-to-image distance. An imaging apparatus that reads images and letters, performs biometric authentication or the like needs to image, for example, a subject (a target to be read or a target to be authenticated) in a size of about 4 times, in a direction perpendicular to an optical axis, as large as an object-to-image distance at the object-to-image distance of 10 mm or less, and to use the obtained image for reading images and letters, performing biometric authentication or the like in some cases. In the case that the imaging lens 10 is applied to such an imaging apparatus, it is possible to suppress distortion, and to ensure a large ratio of the maximum image height to the focal length of the entire system. Therefore, it is possible to image a subject in a wide range at a short object-to-image distance to satisfy the aforementioned need, and to accurately perform reading and authentication.

As an example, each of the configuration examples illustrated in FIG. 2 through FIG. 6 is configured in such a manner that the value of maximum image height IH to focal length f of the entire system is 2.5 or more. Therefore, the configuration examples are appropriately applicable to an imaging apparatus that images a subject in a size of about 4 times, in a direction perpendicular to an optical axis, as large as an object-to-image distance at the object-to-image distance of 10 mm or less. In contrast, the imaging lenses disclosed in Patent Document 1 and Patent Document 2 are fisheye lenses in which distortion is set at high levels. Therefore, although the imaging lenses disclosed in Patent Document 1 and Patent Document 2 have wide angles of view, it is desirable that distortion is further suppressed to use the imaging lenses as lens systems for reading or authentication. Further, the imaging lenses disclosed in Patent Document 1 and Patent Document 2 have the value of the ratio of a maximum image height to the focal length of an entire system of 1.6 or less, which is small. Therefore, it is desirable that a larger maximum image height with respect to the focal length of the entire system is ensured.

Next, the action and effect about conditional expressions of the imaging lens 10 configured as described above will be described more in detail. Here, it is desirable that the imaging lens 10 satisfies one of the following conditional expressions or an arbitrary combination thereof. It is desirable that a conditional expression or expressions to be satisfied are appropriately selected based on what is needed for the imaging lens 10.

It is desirable that paraxial curvature radius L1f of the object-side surface of first lens L1 and paraxial curvature radius L1r of the image-side surface of first lens L1 satisfy the following conditional expression (1):

$$-10 < L1f/L1r < -0.1 \tag{1}$$

It is possible to excellently correct distortion and astigmatism by setting paraxial curvature radius L1r of the image-side surface of first lens L1 and paraxial curvature radius L1f of the object-side surface of first lens L1 to satisfy the upper limit of conditional expression (1). Further, it is possible to appropriately achieve a wider angle of view by setting paraxial curvature radius L1r of the image-side surface of first lens L1 and paraxial curvature radius L1f of the object-side surface of first lens L1 to satisfy the lower limit of conditional expression (1). It is desirable that conditional expression (1-1) is satisfied to further improve this effect:

$$-5 < L1f/L1r < -0.2 \tag{1-1}$$

Further, it is desirable that paraxial curvature radius L1f of the object-side surface of first lens L1 and paraxial curvature radius L1r of the image-side surface of first lens L1 satisfy the following conditional expression (2):

$$-0.9 < (L1f+L1r)/(L1f-L1r) < 0.9 \tag{2}$$

It is possible to excellently correct distortion and astigmatism by setting paraxial curvature radius L1r of the image-side surface of first lens L1 and paraxial curvature radius L1f of the object-side surface of first lens L1 to satisfy the upper limit of conditional expression (2). Further, it is possible to appropriately achieve a wider angle of view by setting paraxial curvature radius L1r of the image-side surface of first lens L1 and paraxial curvature radius L1f of the object-side surface of first lens L1 to satisfy the lower limit of conditional expression (2). It is desirable that conditional expression (2-1) is satisfied to further improve this effect:

$$-0.7 < (L1f+L1r)/(L1f-L1r) < 0.7 \tag{2-1}$$

Further, it is desirable that focal length f1 of first lens L1 at the wavelength of 850 nm and focal length f of an entire system at the wavelength of 850 nm satisfy the following conditional expression (3):

$$-0.2 < f/f1 < -0.05 \tag{3}$$

The negative refractive power of first lens L1 is not too weak relative to the refractive power of the entire system by ensuring sufficient refractive power of first lens L1 so as to satisfy the upper limit of conditional expression (3), and that is advantageous to achievement of a wider an angle of view. The negative refractive power of first lens L1 is not too strong relative to the refractive power of the entire system by suppressing the refractive power of first lens L1 so as to satisfy the lower limit of conditional expression (3), and it is possible to excellently correct distortion and astigmatism. Further, it is desirable that conditional expression (3-1) is satisfied to further improve this effect:

$$-0.17 < f/f1 < -0.07 \tag{3-1}$$

Further, it is desirable that focal length f1 of first lens L1 at the wavelength of 850 nm and focal length f2 of second lens L2 at the wavelength of 850 nm satisfy the following conditional expression (4):

$$0.5 < f1/f2 < 5 \tag{4}$$

The refractive power of second lens L2 with respect to the refractive power of first lens L1 is not too strong by suppressing the refractive power of second lens L2 with respect to the refractive power of first lens L1 so as to satisfy the upper limit of conditional expression (4), and that is advantageous to achievement of a wider angle of view. Further, the refractive power of second lens L2 with respect to the refractive power of first lens L1 is not too weak by maintaining the refractive power of second lens L2 with respect to the refractive power of first lens L1 so as to satisfy the lower limit of conditional expression (4), and it is possible to excellently correct distortion and astigmatism. It is desirable that conditional expression (4-1) is satisfied to further improve this effect:

$$0.7 < f1/f2 < 3.5 \tag{4-1}$$

Further, it is desirable that paraxial curvature radius L2f of the object-side surface of second lens L2 and paraxial curvature radius L2r of the image-side surface of second lens L2 satisfy the following conditional expression (5):

$$0.1 < (L2f-L2r)/(L2f+L2r) < 1 \tag{5}$$

Setting paraxial curvature radius L2f of the object-side surface of second lens L2 and paraxial curvature radius L2r of the image-side surface of second lens L2 so as to satisfy the upper limit of conditional expression (5) is advantageous to achievement of a wider angle of view. It is possible to excellently correct distortion and astigmatism by setting paraxial curvature radius L2f of the object-side surface of second lens L2 and paraxial curvature radius L2r of the image-side surface of second lens L2 so as to satisfy the lower limit of conditional expression (5). It is desirable that conditional expression (5-1) is satisfied to further improve this effect:

$$0.5 < (L2f-L2r)/(L2f+L2r) < 0.98 \tag{5-1}$$

Further, it is desirable that combined focal length f12 of first lens L1 and second lens L2 at the wavelength of 850 nm and distance d23 on an optical axis between second lens L2 and third lens L3 (a distance on the optical axis from the image-side surface of second lens L2 to the object-side surface of third lens L3) satisfy the following conditional expression (6):

$$-3 < d23/f12 < -1 \quad (6).$$

Setting the product of the combined refractive power of first lens L1 and second lens L2 and distance d23 on the optical axis between second lens L2 and third lens L3 so as to satisfy the upper limit of conditional expression (6) is advantageous to achievement of a wider angle of view. It is possible to appropriately reduce the total lens length by setting the product of the combined refractive power of first lens L1 and second lens L2 and distance d23 on the optical axis between second lens L2 and third lens L3 so as to satisfy the lower limit of conditional expression (6), and that is advantageous to reduction in the object-to-image distance. It is desirable that conditional expression (6-1) is satisfied to further improve this effect:

$$-2.5 < d23/f12 < -1.2 \quad (6\text{-}1).$$

The imaging lens 10 is able to achieve higher image formation performance by appropriately satisfying the aforementioned desirable conditions.

As describe above, according to the wide-angle imaging lens of the present embodiment, which consists of three lenses of first lens L1, second lens L2 and third lens L3, it is possible to provide a wide-angle lens system having high image formation performance in the range from a central angle of view to a peripheral angle of view, and in which an appropriate ratio of the maximum image height to the focal length of the entire system is ensured, by optimizing each of the lenses.

Next, an example of an imaging apparatus that performs imaging by using near infrared rays in the wavelength band of about 700 nm through 1000 nm will be described, as an imaging apparatus according to an embodiment of the present disclosure. The imaging apparatus according to the embodiment of the present disclosure includes the imaging lens according to an embodiment of the present disclosure.

Conventionally, an apparatus that measures hemoglobin concentrations by using near infrared rays in the wavelength band of about 700 nm through 1000 nm was developed (please refer to M. Takeda et al., "Measurement of Hemoglobin Concentration using the Noninvasive Peripheral Blood Vessel Monitoring Device with the Near-infrared Spectroscopic Imaging Method", Health science: annual reports of School of Health Sciences, Faculty of Medicine, Kyoto University, Vol. 2, pp. 9-13, 2005).

The near infrared rays of such a wavelength band tend to be absorbed by hemoglobin contained in blood, and tend to pass through living body tissue. Therefore, it is possible to obtain an image representing peripheral blood vessels of a hand or a finger by illuminating the hand or the finger with near infrared rays, and by imaging the hand or the finger by a camera using an imaging device, such as a CCD (Charge Coupled Device) or a CMOS (Complementary Metal Oxide Semiconductor). The apparatus that measures hemoglobin concentrations obtains a hemoglobin concentration in blood by analyzing an image representing peripheral blood vessels obtained in this manner.

Further, an imaging apparatus for biometric authentication that identifies an individual based on an image representing peripheral blood vessels obtained, by using the aforementioned technique, by imaging a hand or a finger by a small-size camera has been proposed. Such an imaging apparatus for biometric authentication mainly observes veins near the surface of a skin. The veins near the surface of the skin contain a large amount of deoxyhemoglobin, and the peak of light absorption by deoxyhemoglobin is in the vicinity of 760 nm. Therefore, it is possible to observe an image representing peripheral blood vessels based on an image representing a hand or a finger obtained by imaging by using a wavelength band close to the vicinity of 760 nm.

Further, arteries contain a large amount of oxyhemoglobin, and the peak of light absorption by oxyhemoglobin is present toward the longer wavelength side than 760 nm. In the case that a user wants to observe peripheral blood vessels in detail, it is desirable to utilize also this absorption of oxyhemoglobin. It is desirable to observe an image representing peripheral blood vessels obtained by imaging by using a wavelength band of near infrared rays in the vicinity of 850 nm, at which absorption rates are high for both types of hemoglobin.

Further, in the aforementioned imaging apparatus for biometric authentication, an authentication target needs to be imaged in a wide range in a direction perpendicular to an optical axis at a short object-to-image distance, and to use the image, obtained by imaging, for biometric authentication and the like.

An imaging apparatus according to an embodiment of the present disclosure is an imaging apparatus for biometric authentication including the imaging lens of the present disclosure. In this imaging apparatus, for example, near infrared rays the wavelength of which is 700 nm or more and 1000 nm or less may be used. Further, it is desirable to use near infrared rays the wavelength of which is 820 nm or more and 880 nm or less.

Figure 13:
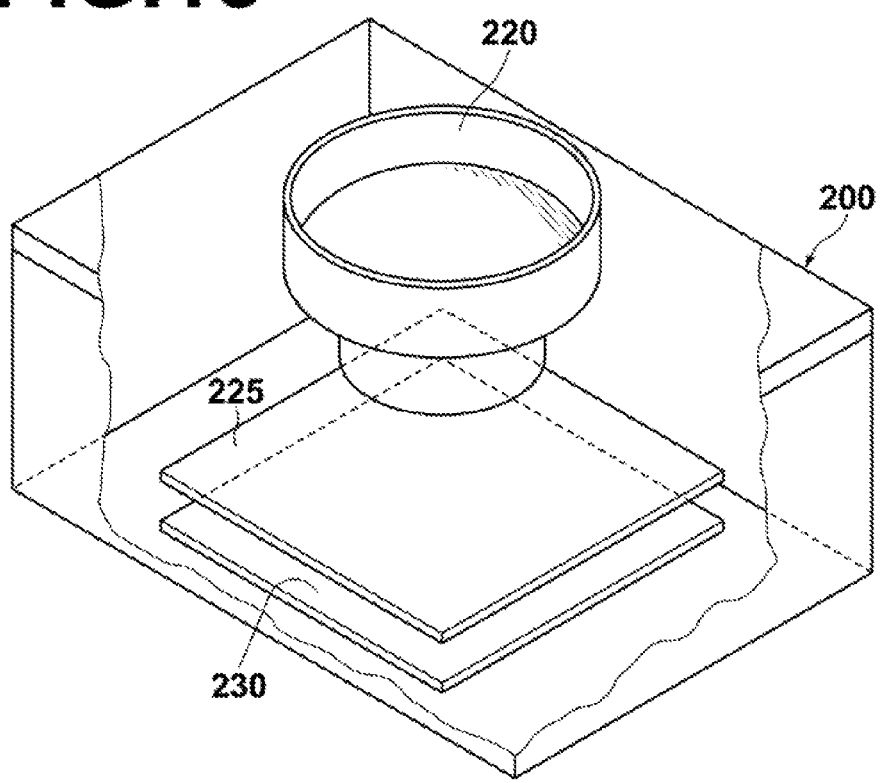
FIG. 13 is an enlarged perspective view illustrating an enlarged view of the inside of the imaging apparatus illustrated in FIG. 12.

An imaging apparatus for biometric authentication, which is an imaging apparatus 200 according to an embodiment of the present disclosure, will be described with reference to FIG. 12 and FIG. 13. FIG. 12 is a schematic cross section illustrating the configuration of the imaging apparatus 200 for biometric authentication using the imaging lens of the present disclosure. FIG. 13 is an enlarged perspective view illustrating an enlarged view of the inside of the imaging apparatus illustrated in FIG. 12.

The imaging apparatus 200 for biometric authentication identifies an individual by observing a human finger 201.

The imaging apparatus 200 illuminates the human finger 201 by an infrared ray lamp 210, and forms an image of the vicinity of the surface of this finger 201 on a light receiving surface of an imaging device 230 through an imaging lens 220 and an infrared ray pass filter 225, which passes infrared rays and blocks visible light. Further, the imaging apparatus 200 images an image in the vicinity of the surface of the finger 201, which is formed on this light receiving surface, by the imaging device 230. Image processing is performed on imaging signals (image signals), obtained by imaging by the imaging device 230, by an image processing unit, which is not illustrated, and the processed imaging signals are displayed as a display image on a display device 240.

It is possible to observe peripheral blood vessels of veins present near the surface of the skin of this finger 201 based on this image representing the vicinity of the surface of the finger 201 displayed on the display device 240. It is possible to identify an individual by this observation.

In the aforementioned example, the imaging apparatus 200 is configured in such a manner to obtain an image by imaging based on reflection light, which is infrared rays that have been output from the infrared ray lamp 210 and reflected by the surface of the finger 201. Alternatively, the infrared ray lamp 210 may be provided at a position in the imaging apparatus 200 in such a manner that the imaging lens 220 and the infrared ray lamp 210 face each other with the finger 201, which is a subject, therebetween. In this case, the imaging apparatus 200 performs imaging to obtain an image based on transmission light, which is infrared rays that have been output from the infrared ray lamp 210 and have passed through the finger 201. The imaging apparatus 200 is able to appropriately perform biometric authentication by using the image, obtained by imaging, also in the case that the imaging apparatus 200 is configured in this manner to image an image by using transmission light.

The imaging apparatus 200 outputs imaging signals based on an optical image formed by the imaging lens 220 of the present disclosure, which has excellent image formation performance. Therefore, a high resolution image obtained by imaging is obtainable. Further, the imaging lens 220 mounted on the imaging apparatus 200 is able to suppress distortion, and to ensure an appropriate ratio of the maximum image height to the focal length of the entire system. Therefore, it is possible to appropriately satisfy the need for imaging an authentication target in a wide range in a direction perpendicular to an optical axis at a short object-to-image distance, and using the image, obtained by imaging, for biometric authentication. It is possible to perform highly accurate biometric authentication by using the image obtained by imaging.

In the case that an imaging apparatus according to an embodiment of the present disclosure performs imaging by using a wavelength band of 700 nm or more and 1000 nm or less, it is desirable that the imaging apparatus includes a filter that cuts visible light or an optical member to which coating for cutting visible light has been applied toward the object side of the first lens or toward the image side of the third lens to obtain infrared rays in a desirable wavelength band. Alternatively, surface treatment that blocks visible light and passes infrared rays may be applied to one of the surfaces of first lens L1 through third lens L3. Unnecessary wavelength components are removed by narrowing the wavelength band used in imaging. Therefore, it is possible to reduce a flare component, and to improve resolution.

Instead, an imaging apparatus according to an embodiment of the present disclosure may perform imaging by using the wavelength band of visible light.

Next, specific numerical value examples of the imaging lens according to the embodiments of the present disclosure will be described. In the following descriptions, plural numerical value examples will be described collectively.

TABLE 1, TABLE 2 and TABLE 3, which will be presented later, show specific lens data corresponding to the configuration of the imaging lens 10 in Example 1, illustrated in FIG. 1. Specifically, TABLE 1 shows basic lens data, and TABLE 2 shows specification data. TABLE 3 shows data about aspheric surfaces. In the lens data shown in TABLE 1, the column of surface number Si shows the number of an i-th surface, to which the sign is assigned in such a manner that the number sequentially increases from the object side toward the image side, regarding an object plane indicating an object position, as the first surface. The column of curvature radius Ri shows the value of the curvature radius (mm) of the i-th surface from the object side, which corresponds to the sign of Ri, assigned in FIG. 1. The column of surface distance Di shows a distance (mm) on an optical axis between the i-th surface Si from the object side and the (i+1)-th surface S(i+1) from the object side. The column of Nj shows the value of the refractive index of a j-th optical element from the object side for the wavelength of 850 nm.

TABLE 1 shows data including also a plane (i=1) at which an object is located, an object-side surface and an image-side surface (i=2, 3) of cover glass CG1 for protecting the lens, which is a parallel flat plate, aperture stop St (i=8) and an object-side surface and an image-side surface (i=9, 10) of cover glass CG2 for protecting the light receiving surface. In TABLE 1, a surface number and term "(Obj)" are written in the column of surface numbers for a surface corresponding to the object plane. A surface number and the term "(St)" are written in the column of surface numbers for a surface corresponding to aperture stop St. The sign of a curvature radius is positive when the shape of a surface is convex toward the object side, and negative when the shape of a surface is convex toward the image side.

Further, TABLE 2 shows focal length f of an entire system (mm) at the wavelength of 850 nm, F-number Fno., maximum angle of view 2ω (°), object-to-image distance TTL (mm), which is a distance on an optical axis from an object plane to an image plane, and ratio IH/f, which is the ratio of maximum image height IH to focal length f of the entire system at the wavelength of 850 nm, as specification data. In object-to-image distance TTL, the value of an air equivalent back focus is used as a back focus. Further, in TABLE 2, F-number Fno. and maximum angle of view 2ω show values in the case that infrared rays (the wavelength is 850 nm) are a reference wavelength and an object distance is 1.5 mm. In the lens data and the specification data, degrees are used as the unit of angles, and "mm" is used as the unit of length. However since an optical system is usable by proportionally being enlarged or by proportionally being reduced, other appropriate units may be used.

In the imaging lens of this Example 1, both surfaces of each of all first lens L1 through third lens L3 are aspherical. The basic lens data in TABLE 1 show the numerical values of curvature radii in the vicinity of the optical axis (paraxial curvature radii), as curvature radii of these aspheric surfaces.

TABLE 3 shows aspheric surface data in the imaging lens in Example 1. In the numerical values shown as aspheric surface data, the sign "E" represents that the numerical value following the sign "E" is an "exponent" with 10, as a base, and that the numerical value preceding the sign "E" is multiplied by a numerical value expressed by an exponential function of 10, as the base, raised to the power of the exponent. For example, "1.0E-02" means "1.0×10$^{-2}$".

As aspheric surface data, the values of coefficients An, KA in an aspherical equation represented by the following expression (A) are written. More specifically, Z represents the length (mm) of a perpendicular from a point on an aspheric surface at a position of height h from the optical axis to a plane in contact with the vertex of the aspheric surface (a plane perpendicular to the optical axis).

[Expression 1]

$$Z = \frac{C \times h^2}{1 + \sqrt{1 - KA \times C^2 \times h^2}} + \sum_n An \times h^n, \quad (A)$$

where
Z: the depth of an aspheric surface (mm),
h: a distance (height) from an optical axis to a lens surface (mm),
C: a paraxial curvature=1/R
(R: a paraxial curvature radius), An: an n-th order aspherical coefficient (n is an integer of 3 or greater), and KA: an aspherical coefficient.

TABLE 4 through TABLE 15 show specific lens data corresponding to the configuration of imaging lenses illustrated in FIG. 3 through 6, as Example 2 through Example 5, in a similar manner to the imaging lens in Example 1, described above. In the imaging lenses of these Examples 1 through 5, both surfaces of each of all first lens L1 through third lens L3 are aspherical.

FIG. 7 illustrates aberration diagrams representing, in order from the left side, a spherical aberration, astigmatism and distortion. Aberration diagrams of a spherical aberration, astigmatism and distortion illustrate aberrations when infrared rays (the wavelength is 850 nm) are a reference wavelength. In an aberration diagram of astigmatism, a solid line indicates aberrations in a sagittal direction (S), and a broken line indicates aberrations in a tangential direction (T). Further, Fno. represents an F-number, and ω represents a half value of the maximum angle of view. In FIG. 7, Fno. and ω represent values when an object distance is 1.5 mm.

Similarly, FIG. 8 through FIG. 11 illustrate various aberrations about the imaging lenses in Example 2 through Example 5. The meaning of the signs was described by using FIG. 7 as an example, and the meaning is basically similar also in FIG. 8 through FIG. 11. All of the aberration diagrams illustrated in FIG. 8 through FIG. 11 are aberration diagrams when an object distance is 1.5 mm.

Further, TABLE 16 shows values related to conditional expressions (1) through (6) for Examples 1 through 5. Further, TABLE 16 shows also focal length f1 of first lens L1 at 850 nm, focal length f2 of second lens L2 at 850 nm, and focal length f3 of third lens L3 at 850 nm.

TABLE 1

| EXAMPLE 1 | | | |
|---|---|---|---|
| Si | Ri | Di | Nj |
| 1(Obj) | ∞ | 1.5000 | |
| 2 | ∞ | 0.5000 | 1.48356 |
| 3 | ∞ | 3.8600 | |
| *4 | −0.8578975 | 0.2170 | 1.53644 |
| *5 | 2.2981708 | 0.4910 | |
| *6 | 3.9238633 | 0.2120 | 1.53644 |
| *7 | 0.4965725 | 0.5700 | |
| 8(St) | ∞ | 0.0850 | |
| *9 | 12.9151878 | 0.3980 | 1.52669 |
| *10 | −0.2305578 | 0.3780 | |

TABLE 1-continued

| EXAMPLE 1 | | | |
|---|---|---|---|
| Si | Ri | Di | Nj |
| 11 | ∞ | 0.3000 | 1.50984 |
| 12 | ∞ | 0.0218 | |

*ASPHERIC SURFACE

TABLE 2

| f | 0.1569 |
|---|---|
| Fno. | 2.51 |
| 2ω | 144.0 |
| TTL | 8.5328 |
| IH/f | 2.8137 |

TABLE 3

| EXAMPLE 1 - ASPHERIC SURFACE DATA | | | | | |
|---|---|---|---|---|---|
| SURFACE NUMBER | KA | A3 | A4 | A5 | A6 |
| 4 | 9.0537263E−02 | 9.0547459E−01 | −3.4988387E−01 | −1.6173787E−01 | 1.2272842E−01 |
| 5 | 2.9656419E+00 | 0.0000000E+00 | 2.5074399E−01 | 0.0000000E+00 | −1.5868223E−01 |
| 6 | 1.9138670E+01 | 0.0000000E+00 | 2.6361501E−01 | 0.0000000E+00 | −2.0428772E−01 |
| 7 | −1.5553932E+00 | 1.8860094E+00 | −3.0492474E+00 | −1.0779423E+00 | −2.3895171E+01 |
| 9 | 1.6196481E+01 | 0.0000000E+00 | −4.9672651E+01 | 3.8673303E+02 | 1.2827330E+03 |
| 10 | −2.0788054E−01 | 0.0000000E+00 | 5.2168080E+00 | −5.3678764E+01 | −6.1307806E+01 |

| SURFACE NUMBER | A7 | A8 | A9 | A10 | A11 | A12 |
|---|---|---|---|---|---|---|
| 4 | 9.0911531E−02 | −4.9999164E−02 | −2.8828273E−02 | 1.6709173E−02 | 0.0000000E+00 | −5.3688904E−04 |
| 5 | 0.0000000E+00 | 6.3018285E−02 | 0.0000000E+00 | −1.5827276E−01 | 0.0000000E+00 | 8.6522403E−02 |
| 6 | 0.0000000E+00 | −4.5738029E−02 | 0.0000000E+00 | −7.1849032E−02 | 0.0000000E+00 | 0.0000000E+00 |
| 7 | 9.7935952E+01 | 2.2645300E+02 | 2.9383524E+02 | −1.7146170E+03 | 0.0000000E+00 | 0.0000000E+00 |
| 9 | −6.8336176E+03 | −1.4670488E+05 | −8.4607095E+05 | 1.1938674E+07 | 0.0000000E+00 | −1.1633624E+08 |
| 10 | 3.6299379E+02 | 1.3588688E+03 | 1.5510741E+03 | −2.5636784E+04 | 0.0000000E+00 | −3.2966547E+03 |

TABLE 4

| EXAMPLE 2 | | | |
|---|---|---|---|
| Si | Ri | Di | Nj |
| 1(Obj) | ∞ | 1.5000 | |
| 2 | ∞ | 0.5000 | 1.48356 |
| 3 | ∞ | 3.8600 | |
| *4 | −1.8258555 | 0.2172 | 1.53644 |
| *5 | 2.0377390 | 0.4591 | |
| *6 | 3.9141545 | 0.2119 | 1.53644 |
| *7 | 0.3394962 | 0.6310 | |
| 8(St) | ∞ | 0.0618 | |
| *9 | 4.9782811 | 0.3946 | 1.51911 |
| *10 | −0.2227902 | 0.3300 | |
| 11 | ∞ | 0.3000 | 1.50984 |
| 12 | ∞ | 0.0529 | |

*ASPHERIC SURFACE

TABLE 5

| f | 0.1568 |
|---|---|
| Fno. | 2.59 |
| 2ω | 144.6 |
| TTL | 8.5185 |
| IH/f | 2.5792 |

TABLE 6

EXAMPLE 2 - ASPHERIC SURFACE DATA

| SURFACE NUMBER | KA | A3 | A4 | A5 | A6 |
|---|---|---|---|---|---|
| 4 | 9.0183076E−01 | 8.7337571E−01 | −3.7060511E−01 | −1.6657766E−01 | 1.2155655E−01 |
| 5 | 2.7868193E+00 | 0.0000000E+00 | 2.9856796E−01 | −1.0714668E−03 | −1.3760066E−01 |
| 6 | 2.0056311E+01 | 0.0000000E+00 | 2.0398831E−01 | −9.2209633E−03 | −2.1461441E−01 |
| 7 | −7.6202889E−02 | 2.7758933E+00 | −4.0800239E+00 | −4.1470544E+00 | −3.0587040E+01 |
| 9 | 7.3395282E+02 | 0.0000000E+00 | −4.7193466E+01 | 4.2231192E+02 | 1.3164153E+03 |
| 10 | −2.7004167E−01 | 0.0000000E+00 | 3.5378462E+00 | −4.3583974E+01 | −4.8772521E+01 |

| SURFACE NUMBER | A7 | A8 | A9 | A10 | A11 | A12 |
|---|---|---|---|---|---|---|
| 4 | 9.0005145E−02 | −5.0470760E−02 | −2.8825128E−02 | 1.6942604E−02 | 6.9514200E−05 | −4.3811030E−04 |
| 5 | −2.6792774E−03 | 5.6520325E−02 | −6.4498190E−04 | −1.7496212E−01 | −8.3553260E−04 | 6.9959688E−02 |
| 6 | −1.4754388E−02 | −8.7971919E−02 | −2.5463906E−03 | −8.3691993E−02 | 7.8552540E−04 | 1.4037300E−02 |
| 7 | 9.0570659E−02 | 2.1542421E+02 | 2.4578563E+02 | −1.7558556E+03 | 8.1082586E+01 | −3.6996304E+01 |
| 9 | −7.0351529E+03 | −1.4649723E+05 | −8.1049002E+05 | 1.2011091E+07 | 4.5798121E+05 | −1.1594104E+08 |
| 10 | 3.6466867E+02 | 9.6355220E+02 | 1.0417866E+03 | −2.6357743E+04 | −1.0018712E+03 | 1.2873343E+05 |

TABLE 7

EXAMPLE 3

| Si | Ri | Di | Nj |
|---|---|---|---|
| 1(Obj) | ∞ | 1.5000 | |
| 2 | ∞ | 0.5000 | 1.48356 |
| 3 | ∞ | 3.8600 | |
| *4 | −3.4142487 | 0.2170 | 1.53644 |
| *5 | 1.3884482 | 0.4910 | |
| *6 | 3.9217012 | 0.2120 | 1.53644 |
| *7 | 0.3648484 | 0.5700 | |
| 8(St) | ∞ | 0.0850 | |
| *9 | 11.6418648 | 0.3980 | 1.52669 |
| *10 | −0.2229196 | 0.5280 | |
| 11 | ∞ | 0.0500 | 1.50984 |
| 12 | ∞ | 0.0242 | |

*ASPHERIC SURFACE

TABLE 10

EXAMPLE 4

| Si | Ri | Di | Nj |
|---|---|---|---|
| 1(Obj) | ∞ | 1.5000 | |
| 2 | ∞ | 0.5000 | 1.48356 |
| 3 | ∞ | 3.8600 | |
| *4 | −0.8986224 | 0.2170 | 1.53644 |
| *5 | 2.2685061 | 0.4910 | |
| *6 | 15.5568769 | 0.2120 | 1.53644 |
| *7 | 0.4303123 | 0.5700 | |
| 8(St) | ∞ | 0.0850 | |
| *9 | 31.3331738 | 0.3980 | 1.52648 |
| *10 | −0.2274148 | 0.3780 | |
| 11 | ∞ | 0.3000 | 1.50984 |
| 12 | ∞ | 0.0308 | |

*ASPHERIC SURFACE

TABLE 8

| F | 0.1676 |
|---|---|
| Fno. | 2.51 |
| 2ω | 143.8 |
| TTL | 8.4352 |
| IH/f | 2.5120 |

TABLE 11

| F | 0.1447 |
|---|---|
| Fno. | 2.50 |
| 2ω | 144.8 |
| TTL | 8.5418 |
| IH/f | 2.7459 |

TABLE 9

EXAMPLE 3 - ASPHERIC SURFACE DATA

| SURFACE NUMBER | KA | A3 | A4 | A5 | A6 |
|---|---|---|---|---|---|
| 4 | 2.8388150E+00 | 7.3188648E−01 | −3.5308936E−01 | −1.5429531E−01 | 1.0906124E−01 |
| 5 | 2.5661548E+00 | 0.0000000E+00 | 4.8782086E−01 | 0.0000000E+00 | −2.8221366E−01 |
| 6 | 2.0096606E+01 | 0.0000000E+00 | 3.1273715E−01 | 0.0000000E+00 | −1.6948249E−01 |
| 7 | −2.9951298E−01 | 2.3253104E+00 | −4.1003582E+00 | −7.0931252E+00 | −3.3994975E+01 |
| 9 | 3.7924496E+03 | 0.0000000E+00 | −5.0142370E+01 | 3.8707218E+02 | 1.3026042E+03 |
| 10 | −4.1548282E−01 | 0.0000000E+00 | 4.5495495E+00 | −5.4900555E+01 | −6.3102164E+01 |

| SURFACE NUMBER | A7 | A8 | A9 | A10 | A11 | A12 |
|---|---|---|---|---|---|---|
| 4 | 9.5392421E−02 | −4.6970308E−02 | −2.6582120E−02 | 1.8458041E−02 | 0.0000000E+00 | 5.7871844E−04 |
| 5 | 0.0000000E+00 | 3.5563784E−02 | 0.0000000E+00 | −1.6864488E−01 | 0.0000000E+00 | 5.8940317E−02 |
| 6 | 0.0000000E+00 | 1.5487671E−03 | 0.0000000E+00 | −8.5285611E−03 | 0.0000000E+00 | 8.2948922E−02 |
| 7 | 9.1818765E+01 | 2.5717655E+02 | 3.6902875E+02 | −1.4197287E+03 | 0.0000000E+00 | 3.4110910E+03 |
| 9 | −6.7111083E+03 | −1.4637564E+05 | −8.4734405E+05 | 1.1914835E+07 | 0.0000000E+00 | −1.1942666E+08 |
| 10 | 3.6295876E+02 | 1.3372053E+03 | 1.4623094E+03 | −2.5952994E+04 | 0.0000000E+00 | 2.0749753E+03 |

TABLE 12

| EXAMPLE 4 - ASPHERIC SURFACE DATA | | | | | |
|---|---|---|---|---|---|
| SURFACE NUMBER | KA | A3 | A4 | A5 | A6 |
| 4 | 9.7639331E−02 | 9.1228037E−01 | −3.5309751E−01 | −1.6310779E−01 | 1.2247069E−01 |
| 5 | 2.1194350E+00 | 0.0000000E+00 | 2.6732170E−01 | 0.0000000E+00 | −1.0551984E−01 |
| 6 | 2.0467824E+01 | 0.0000000E+00 | 2.4156248E−01 | 0.0000000E+00 | −2.0987801E−01 |
| 7 | −1.0119178E+00 | 2.0388672E+00 | −3.1983476E+00 | −4.1094849E+00 | −2.5549532E+01 |
| 9 | −1.5854021E+03 | 0.0000000E+00 | −4.5965720E+01 | 4.1240177E+02 | 1.4045765E+03 |
| 10 | −3.0700130E−01 | 0.0000000E+00 | 5.8966129E+00 | −5.3293175E+01 | −6.2016727E+01 |
| SURFACE NUMBER | A7 | A8 | A9 | A10 | A11 | A12 |
| 4 | 9.0703100E−02 | −4.9870450E−02 | −2.8721509E−02 | 1.6794011E−02 | 0.0000000E+00 | −5.1502769E−04 |
| 5 | 0.0000000E+00 | 8.0133507E−02 | 0.0000000E+00 | −1.6993895E−01 | 0.0000000E+00 | 7.2840551E−02 |
| 6 | 0.0000000E+00 | −6.1734769E−02 | 0.0000000E+00 | −1.0647462E−01 | 0.0000000E+00 | 4.5636958E−02 |
| 7 | 9.3888482E+01 | 2.1827813E+02 | 2.9983266E+02 | −1.9112536E+03 | 0.0000000E+00 | −1.9121091E+02 |
| 9 | −6.7918888E+03 | −1.5200815E+05 | −8.6220273E+05 | 1.1854676E+07 | 0.0000000E+00 | −1.1414050E+08 |
| 10 | 3.3745134E+02 | 1.3321877E+03 | 1.5294539E+03 | −2.5561331E+04 | 0.0000000E+00 | 3.1298967E+04 |

TABLE 13

| EXAMPLE 5 | | | |
|---|---|---|---|
| Si | Ri | Di | Nj |
| 1(Obj) | ∞ | 1.5000 | |
| 2 | ∞ | 0.5000 | 1.48356 |
| 3 | ∞ | 3.8600 | |
| *4 | −0.8226761 | 0.2170 | 1.53694 |
| *5 | 2.1416883 | 0.4910 | |
| *6 | 3.9870137 | 0.2120 | 1.53694 |
| *7 | 0.4677268 | 0.5700 | |
| 8(St) | ∞ | 0.0850 | |
| *9 | 19.2412411 | 0.3980 | 1.52721 |
| *10 | −0.2336221 | 0.3780 | |
| 11 | ∞ | 0.3000 | 1.50984 |
| 12 | ∞ | 0.0408 | |

*ASPHERIC SURFACE

TABLE 14

| F | 0.1531 |
|---|---|
| Fno. | 2.52 |
| 2ω | 144.4 |
| TTL | 8.5518 |
| IH/f | 2.8318 |

TABLE 15

| EXAMPLE 5 - ASPHERIC SURFACE DATA | | | | | |
|---|---|---|---|---|---|
| SURFACE NUMBER | KA | A3 | A4 | A5 | A6 |
| 4 | 9.3807601E−02 | 9.0563758E−01 | −3.4366560E−01 | −1.6066870E−01 | 1.2301125E−01 |
| 5 | 2.8733895E+00 | 0.0000000E+00 | 2.4705025E−01 | 0.0000000E+00 | −1.5997172E−01 |
| 6 | 2.0169901E+01 | 0.0000000E+00 | 2.1381181E−01 | 0.0000000E+00 | −2.3092442E−01 |
| 7 | −2.1266403E+00 | 1.3311567E+00 | −3.0329358E+00 | 3.1333361E+00 | −2.3076791E+01 |
| 9 | 1.1916495E+04 | 0.0000000E+00 | −4.8844608E+01 | 4.0288521E+02 | 1.4093911E+03 |
| 10 | −1.9168294E−01 | 0.0000000E+00 | 4.9254752E+00 | −5.2335993E+01 | −5.9796822E+01 |
| SURFACE NUMBER | A7 | A8 | A9 | A10 | A11 | A12 |
| 4 | 9.0971690E−02 | −5.0022408E−02 | −2.8838348E−02 | 1.6687726E−02 | 0.0000000E+00 | −5.5846661E−04 |
| 5 | 0.0000000E+00 | 5.7286387E−02 | 0.0000000E+00 | −1.6157209E−01 | 0.0000000E+00 | 8.1703207E−02 |
| 6 | 0.0000000E+00 | −5.6016936E−02 | 0.0000000E+00 | −8.5214189E−02 | 0.0000000E+00 | 0.0000000E+00 |
| 7 | 9.4646333E+01 | 2.1615244E+02 | 2.4035917E+02 | −1.8813093E+03 | 0.0000000E+00 | 0.0000000E+00 |
| 9 | −6.3031717E+03 | −1.4655521E+05 | −8.5855639E+05 | 1.1845297E+07 | 0.0000000E+00 | −1.2052291E+08 |
| 10 | 3.6293121E+02 | 1.3512874E+03 | 1.6075886E+03 | −2.4944792E+04 | 0.0000000E+00 | 2.2235631E+04 |

TABLE 16

TABLE ABOUT CONDITIONAL EXPRESSIONS

| EXPRESSION NUMBER | CONDITIONAL EXPRESSION | EXAMPLE 1 | EXAMPLE 2 | EXAMPLE 3 | EXAMPLE 4 | EXAMPLE 5 |
|---|---|---|---|---|---|---|
| | f1 | −1.137 | −1.761 | −1.811 | −1.172 | −1.079 |
| | f2 | −1.083 | −0.708 | −0.766 | −0.829 | −1.008 |
| | f3 | 0.435 | 0.422 | 0.420 | 0.431 | 0.441 |
| 1 | L1f/L1r | −0.373 | −0.896 | −2.459 | −0.396 | −0.384 |
| 2 | (L1f + L1r)/(L1f − L1r) | −0.456 | −0.055 | 0.422 | −0.433 | −0.445 |
| 3 | f/f1 | −0.138 | −0.089 | −0.093 | −0.123 | −0.142 |
| 4 | f1/f2 | 1.050 | 2.488 | 2.365 | 1.413 | 1.071 |
| 5 | (L2f − L2r)/(L2f + L2r) | 0.775 | 0.840 | 0.830 | 0.946 | 0.790 |
| 6 | d23/f12 | −1.581 | −1.754 | −1.541 | −1.843 | −1.708 |

As these numerical value data and aberration diagrams show, each of the examples has achieved a wider angle of view while reducing size, and has achieved higher image formation performance.

All of the aforementioned paraxial curvature radius, surface distance and refractive index were measured by those specialized in optical measurement by using the following methods.

The paraxial curvature radius is obtained by measuring a lens by using ultra accuracy 3-D measurement machine UA3P (manufactured by Panasonic Factory Solutions Co., Ltd.), and by performing the following procedures. Paraxial curvature radius $R_m$ (m is a natural number) and conic coefficient $K_m$ are tentatively set and input to the UA3P, and an n-th order aspherical coefficient An in the aspherical equation is calculated from these input data and measured data by using a fitting function provided in the UA3P. In the aforementioned aspherical equation (A), it is assumed that $C=1/R_m$ and $KA=K_m-1$. Depth Z of an aspheric surface in the direction of the optical axis corresponding to height h from the optical axis is calculated based on $R_m$, $K_m$, An and the aspherical equation. A difference between calculated depth Z and depth Z', which is an actually measured value, is obtained at each height h from the optical axis, and judgment is made as to whether this difference is within a predetermined range or not. If the difference is within the predetermined range, the set $R_m$ is determined as the paraxial curvature radius. However, if the difference is outside the predetermined range, the following processing is repeated until the difference between calculated depth Z and depth Z', which is an actually measured value, at each height h from the optical axis becomes within the predetermined range. At least one of the values of $R_m$ and $K_m$ used in calculation of the difference is changed, and the values are set as $R_{m-1}$ and $K_{m+1}$, and input to the UA3P. Further, processing similar to the aforementioned processing is performed, and judgment is made as to whether the difference between calculated depth Z and depth Z', which is an actually measured value, at each height h from the optical axis is within the predetermined range. Processing is repeated until the difference becomes within the predetermined range. Here, the expression "within the predetermined range" means 200 nm or less. Further, the range of h corresponds to a range within 0 to ⅕ of the maximum outer diameter of the lens.

The surface distance is measured by using OptiSurf (manufactured by Trioptics), which is a central—thickness and surface—distance measurement device for measuring lengths about a lens assembly.

The refractive index is obtained by measurement using precision refractometer KPR-2000 (manufactured by Shimadzu Corporation) while the temperature of an object to be tested is set at 25° C. Here, an example in which the wavelength of 850 nm is adopted is illustrated. Therefore, the refractive index measured by using infrared rays (the wavelength is 850 nm) is set as N. In the case that a wavelength other than the wavelength of 850 nm is adopted for the imaging lens, a refractive index measured by the adopted wavelength is set as N.

The embodiment of the imaging apparatus 200 was described by using the biometric authentication apparatuses, as an example. However, the imaging apparatus of the present disclosure is not limited to this. The imaging apparatus 200 may be appropriately applicable to a relatively small-sized imaging apparatus having a wide angle of view, and which uses an imaging device, such as a CCD and a CMOS. For example, the imaging lens of the present disclosure is applicable also to reading apparatuses, such as an image scanner, a copier and a facsimile, which read images and letters, biometric authentication apparatuses that authenticate a person by detecting the face, the iris of an eye or the positions of veins of a palm, finger or the like of the person, distinguishing apparatuses that distinguish bills and coins, cellular phone terminals, such as a smart phone, portable information terminals, tablet terminals, microscopes, monitoring apparatuses mounted on door phones or cars to monitor outside situations and the like.

The present disclosure is not limited to the aforementioned embodiments nor examples, and various modifications are possible. For example, the values of the curvature radius, surface distance, refractive index and the like of each lens element are not limited to the numerical values shown in the examples, but may be other values. In this specification, examples optimized for the wavelength of 850 nm were described, but embodiments designed for other wavelengths are also possible.

What is claimed is:

1. An imaging lens consisting of three lenses of, in order from an object side:
    a first lens having a biconcave shape, and an object-side surface of which is aspherical;
    a second lens having negative refractive power; and
    a third lens having positive refractive power with a convex surface facing an image side,
    wherein the absolute value of a curvature radius of an image-side surface of the third lens is less than the absolute value of a curvature radius of an object-side surface of the third lens.

2. The imaging lens, as defined in claim 1, further comprising:
    an aperture stop located between the second lens and the third lens.

3. The imaging lens, as defined in claim 2, wherein the object-side surface of the first lens includes at least one inflection point at a radially inward position toward an optical axis from an intersection of the object-side surface of the first lens and a principal ray at a maximum angle of view.

4. The imaging lens, as defined in claim 1, wherein the following conditional expression is further satisfied:

$$-10 < L1f/L1r < -0.1 \qquad (1), \text{where}$$

L1f: a paraxial curvature radius of the object-side surface of the first lens, and L1r: a paraxial curvature radius of an image-side surface of the first lens.

5. The imaging lens, as defined in claim 1, wherein the following conditional expression is further satisfied:

$$-0.9 < (L1f+L1r)/(L1f-L1r) < 0.9 \qquad (2), \text{where}$$

L1f: a paraxial curvature radius of the object-side surface of the first lens, and L1r: a paraxial curvature radius of an image-side surface of the first lens.

6. The imaging lens, as defined in claim 1, wherein the following conditional expression is further satisfied:

$$-0.2 < f/f1 < -0.05 \qquad (3), \text{where}$$

f1: a focal length of the first lens at a wavelength of 850 nm, and f: a focal length of an entire system at the wavelength of 850 nm.

7. The imaging lens, as defined in claim 1, wherein the following conditional expression is further satisfied:

$$0.5 < f1/f2 < 5 \qquad (4), \text{where}$$

f1: a focal length of the first lens at a wavelength of 850 nm, and f2: a focal length of the second lens at the wavelength of 850 nm.

8. The imaging lens, as defined in claim 1, wherein the second lens has a meniscus shape with a convex surface facing the object side.

9. The imaging lens, as defined in claim 1, wherein the following conditional expression is further satisfied:

$$0.1 < (L2f-L2r)/(L2f+L2r) < 1 \qquad (5), \text{where}$$

L2f: a paraxial curvature radius of an object-side surface of the second lens, and L2r: a paraxial curvature radius of an image-side surface of the second lens.

10. The imaging lens, as defined in claim 1, wherein the following conditional expression is further satisfied:

$$-3 < d23/f12 < -1 \qquad (6), \text{where}$$

d23: a distance on an optical axis between the second lens and the third lens, and f12: a combined focal length of the first lens and the second lens at a wavelength of 850 nm.

11. The imaging lens, as defined in claim 4, wherein the following conditional expression is further satisfied:

$$-5 < L1f/L1r < -0.2 \qquad (1\text{-}1), \text{where}$$

L1f: a paraxial curvature radius of the object-side surface of the first lens, and L1r: a paraxial curvature radius of an image-side surface of the first lens.

12. The imaging lens, as defined in claim 5, wherein the following conditional expression is further satisfied:

$$-0.7 < (L1f+L1r)/(L1f-L1r) < 0.7 \qquad (2\text{-}1), \text{where}$$

L1f: a paraxial curvature radius of the object-side surface of the first lens, and L1r: a paraxial curvature radius of an image-side surface of the first lens.

13. The imaging lens, as defined in claim 6, wherein the following conditional expression is further satisfied:

$$-0.17 < f/f1 < -0.07 \qquad (3\text{-}1), \text{where}$$

f1: a focal length of the first lens at a wavelength of 850 nm, and f: a focal length of an entire system at the wavelength of 850 nm.

14. The imaging lens, as defined in claim 7, wherein the following conditional expression is further satisfied:

$$0.7 < f1/f2 < 3.5 \qquad (4\text{-}1), \text{where}$$

f1: a focal length of the first lens at a wavelength of 850 nm, and f2: a focal length of the second lens at the wavelength of 850 nm.

15. The imaging lens, as defined in claim 9, wherein the following conditional expression is further satisfied:

$$0.5 < (L2f-L2r)/(L2f+L2r) < 0.98 \qquad (5\text{-}1), \text{where}$$

L2f: a paraxial curvature radius of an object-side surface of the second lens, and L2r: a paraxial curvature radius of an image-side surface of the second lens.

16. The imaging lens, as defined in claim 10, wherein the following conditional expression is further satisfied:

$$-2.5 < d23/f12 < -1.2 \qquad (6\text{-}1), \text{where}$$

d23: a distance on an optical axis between the second lens and the third lens, and f12: a combined focal length of the first lens and the second lens at a wavelength of 850 nm.

17. An imaging apparatus comprising:
an imaging lens, as defined in claim 1.

* * * * *